US006356469B1

United States Patent
Roohparvar et al.

(10) Patent No.: US 6,356,469 B1
(45) Date of Patent: Mar. 12, 2002

(54) LOW VOLTAGE CHARGE PUMP EMPLOYING OPTIMIZED CLOCK AMPLITUDES

(75) Inventors: Bob Roohparvar, San Jose; K. Z. Mahouti, Sunnyvale; Karl Rapp, Los Gatos, all of CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 09/661,485

(22) Filed: Sep. 14, 2000

(51) Int. Cl.[7] .............................................. H02M 3/18
(52) U.S. Cl. ........................................ 363/60; 327/536
(58) Field of Search .............. 363/59, 60; 327/534–537

(56) References Cited

U.S. PATENT DOCUMENTS

| | | | | |
|---|---|---|---|---|
| 4,500,799 A | * | 2/1985 | Sud et al. ................... | 307/449 |
| 5,142,238 A | | 8/1992 | White ............................ | 330/9 |
| 5,280,420 A | * | 1/1994 | Rapp ............................ | 363/60 |
| 5,432,469 A | | 7/1995 | Tedrow et al. .............. | 327/306 |
| 5,592,115 A | * | 1/1997 | Kassapian ................... | 327/239 |
| 5,973,979 A | * | 10/1999 | Chang et al. ............... | 365/226 |
| 6,028,780 A | | 2/2000 | Chang ......................... | 363/60 |

* cited by examiner

Primary Examiner—Matthew Nguyen
(74) Attorney, Agent, or Firm—Skjerven Morrill MacPherson

(57) ABSTRACT

A charge pump system and associated variable-amplitude clock generation circuitry are provided for generating high voltages from a low initial voltage in applications such as erasing and programming electrically erasable programmable read only memory (EEPROM) arrays. The charge pump system uses a power supply voltage and a clock and includes a first phase bootstrapping circuit, an inverter, and a second phase bootstrapping circuit, and charge pump circuitry. The two phase bootstrapping circuits are both responsive to the clock and provide first and second phase clock signals. The inverter is connected to the second phase bootstrapping circuit, causing the second phase clock signal to be opposite in phase from the first clock signal. The charge pump circuitry is responsive to the power supply voltage and the first and second phase clocks and uses native transistors that have lower threshold voltages. A high voltage is produced from the charge pump circuitry by alternately adding charge to the power supply voltage in each cycle of the first and second phase clock signals. The first and second phase clock signals increase in voltage as the voltage level in the charge pump increases in order to overcome increased effective transistor threshold voltages.

17 Claims, 3 Drawing Sheets

LOW VOLTAGE CHARGE PUMP EMPLOYING OPTIMIZED CLOCK AMPLITUDES

CROSS-REFERENCES TO RELATED APPLICATION(S)

The present application contains subject matter related to the following concurrently filed U.S. Patent Application by Bob Roohparvar, K. Z. Mahouti, and Karl Rapp entitled "LOW VOLTAGE CHARGE PUMP EMPLOYING DISTRIBUTED CHARGE BOOSTING" and identified by U.S. Ser. No. 09/662,207.

TECHNICAL FIELD

The present invention relates generally to charge pumps and more particularly to low voltage charge pumps.

BACKGROUND

The popularity of portable electronic devices has substantially increased demand for smaller, lighter, longer lasting portable devices. Thus, a major trend in the manufacture of laptop computers, cell phone, and other portable, battery-powered devices is toward a reduction in the voltage levels required to operate the integrated circuits which are used in the various components of those devices.

In order to reduce power consumption and extend battery life, much of the integrated circuitry used in portable devices is being designed to run at low voltage levels. This reduces the power usage and reduces the heat generated by the circuit components allowing more components to be placed closer to one another. The circuitry and components used in portable computers typically are being designed to operate at voltages levels substantially less than the previous standard of 5V, with 1.8V and lower becoming increasingly common.

However, the desire to not compromise the number and quality of features in portable devices as compared to their non-portable counterparts has led to an increase in the number of circuits used, thus requiring more power. These circuits still require higher voltages to function properly.

An example of a function that requires higher voltages relates to the basic input/output system (BIOS) information of a computer. As improvements in a computer or its peripherals are developed, the BIOS information typically stored in a read only memory (ROM) device or similar circuit providing a non-volatile read only memory needs to be updated. Historically, such changes had to be accomplished by physically removing the ROM and replacing the old circuit with an entirely new circuit having the new BIOS information. The expense and the considerable complexity involved in such procedures made this undesirable for normal computer users.

More recently, electrically erasable programmable read only memory (EEPROM) has been used to store BIOS information. This type of non-volatile memory device can be reprogrammed by running a small update program without removing the circuitry from the computer. Running the update program to reprogram the EEPROM requires approximately 12–16 V for erasing and writing operations. The voltages provided in the batteries of portable computers must be boosted for such operations.

Another example involves Flash EEPROM devices arranged in large arrays to mimic hard disk drives. Flash EEPROM arrays provide a smaller and lighter functional equivalent of a hard disk drive which operates more rapidly and is less sensitive to physical damage. Such memory arrays are especially useful in portable computers where space is at a premium and weight is extremely important. However, Flash EEBPROM arrays also require much higher voltages for writing and erasing data than can be provided directly by the batteries of most portable computers and it is necessary to generate voltages greater than the device supply voltage and/or voltages more negative than ground.

In such instances, where the lower voltage batteries being employed in portable electronic devices are unable to provide a sufficiently high voltage to operate a device or certain circuitry by itself, a "charge pump" or "bucket brigade" circuit has typically been used to generate a higher voltage from the available lower voltage. Such circuits shift electrical charge along a series of diode-connected transistors stages that are driven by capacitively coupled clock drivers, typically two-phase clocks, to boost voltage. The source of the charge, a low voltage battery for example, introduces the charge at one end of the pump and it is shifted along and its voltage is increased until the desired voltage is reached at the output.

A major problem is that conventional charge pumps have difficulty dealing with the lower battery voltages being used. In particular, the MOS transistors used in the charge pumps have switching threshold voltages that are a large fraction of the supply voltage. The problem is related to the fact that diode-connected transistors develop increasing back-bias between the source and the body of the transistor as the voltage increases along the length of the pump. The result of this back-bias (also known as the "source-body effect", "M factor", or "body effect") is to increase the effective threshold of the transistor, in some higher voltage cases almost doubling it. With increased effective transistor thresholds and decreased supply voltages, the charge pump transistors would no longer switch properly and the charge pump would not work.

Many designs used a technique called "bootstrapping" to generate higher amplitude clock signals to compensate for the increased effective threshold voltages relative to the supply voltage. The bootstrapping technique involves the use of a charge capacitor that charges on every clock pulse and discharges between pulses, adding the discharged voltage to the original input voltage of the bootstrapping circuit so the output could be multiplied to a number of times the original input. Applying a uniform high clock voltage, generated by bootstrapping, leads to energy inefficiency because the greater the current delivered by the clocking voltage, the less efficient the bootstrapping operation. In the latter stages where high voltages are required, this inefficiency was unavoidable. In the initial stages of the charge pump, where as high a voltage is not needed, the clock bootstrapping operation was inefficient.

In general, currently available charge pumps are inefficient, large, and complex. They do not properly deal with low initial supply voltages and fail to address the problems inherent with higher threshold voltages caused by the body effect. A solution, which would provide a simple charge pump with efficient operation using a low initial supply voltage, has long been sought but has eluded those skilled in the art. As the popularity grows of portable battery-powered devices in which such a design could be particularly useful, it is becoming more pressing that a solution be found.

DISCLOSURE OF THE INVENTION

The present invention provides a charge pump system and associated variable-amplitude clock generation circuitry that is particularly useful for generating high voltages from a low initial voltage in applications such as erasing and programming electrically erasable programmable read only memory (EEPROM) arrays. The charge pump system uses a power supply voltage and a clock and includes a first phase bootstrapping circuit, an inverter, and a second phase bootstrapping circuit, and charge pump circuitry. The two phase bootstrapping circuits are both responsive to the clock and provide first and second phase clock signals. The inverter is connected to the second phase bootstrapping circuit, causing the second phase clock signal to be generated opposite in phase from the first clock signal. The charge pump circuitry is composed of a plurality of charge pump stages with alternate stages controlled by opposite phased clock signals. A high voltage is produced from the charge pump circuitry by alternately adding charge to the power supply voltage in the charge pump stages on each of the opposite phased clock signals.

The present invention furthermore provides a charge pump system in which the first and second phase bootstrapping circuits provide variable-amplitude clock signals, which increase in voltage for driving progressively higher voltage charge pump stages. This increasing clock amplitude allows for optimized clock signals and results in more efficient operation.

The present invention furthermore provides a charge pump system wherein native transistors are used for a decreased transistor threshold voltage. Such a lowered threshold voltage aids the circuit in operating with lower clock boost voltages.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
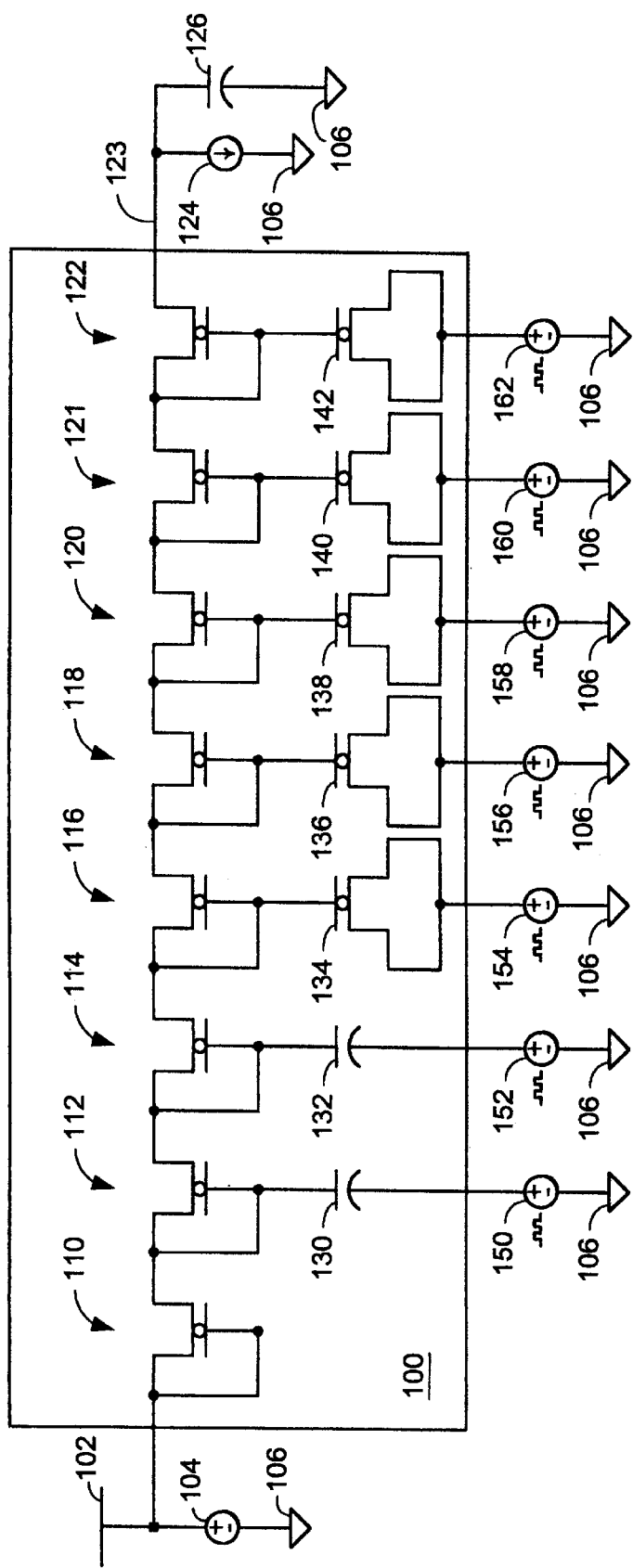
FIG. 1 depicts a transistor level schematic of the charge pump of the present invention.
Figure 2:
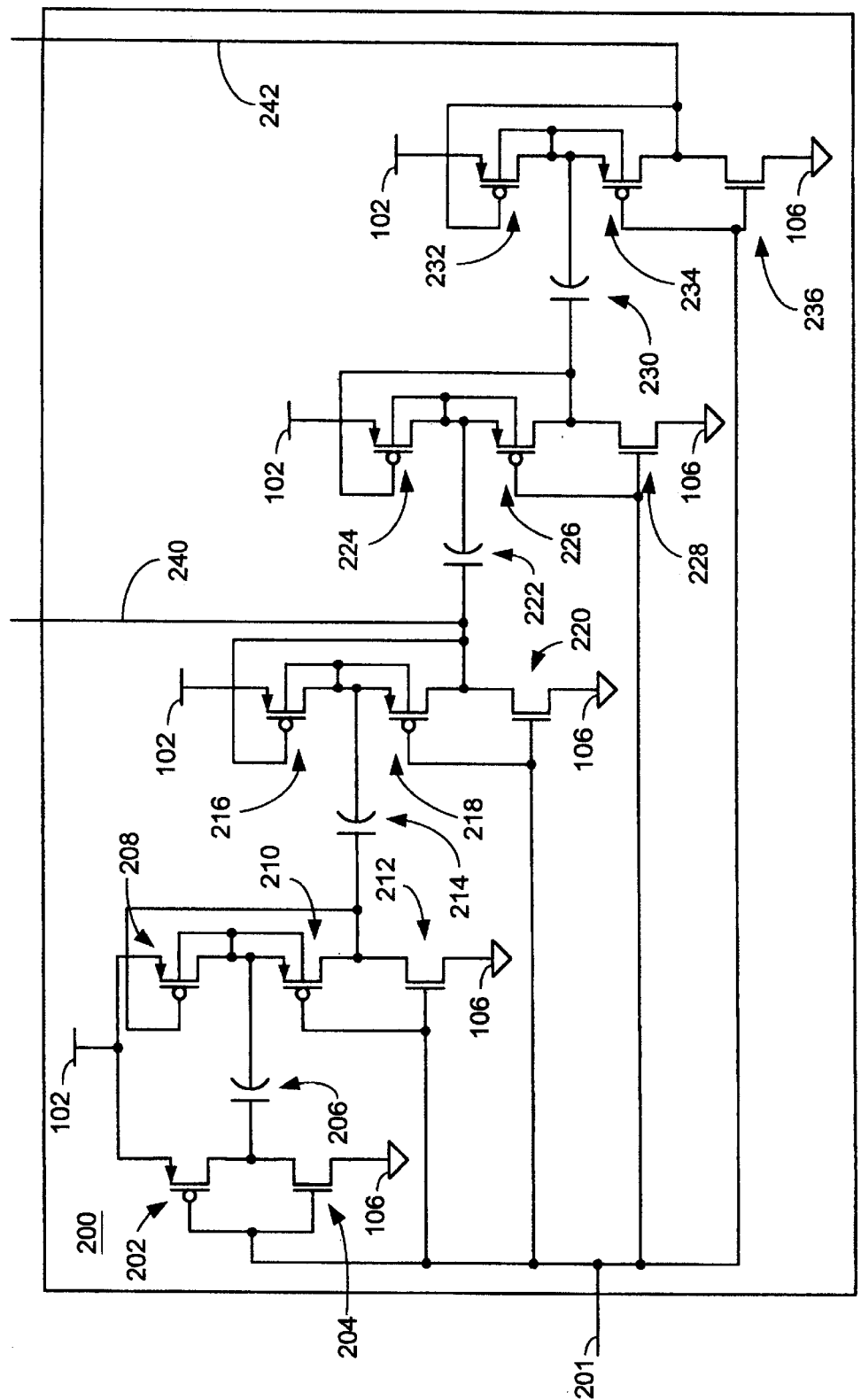
FIG. 2 is a transistor level schematic of the bootstrapping circuitry used in variable-amplitude clock signal generation for the present invention.
Figure 3:
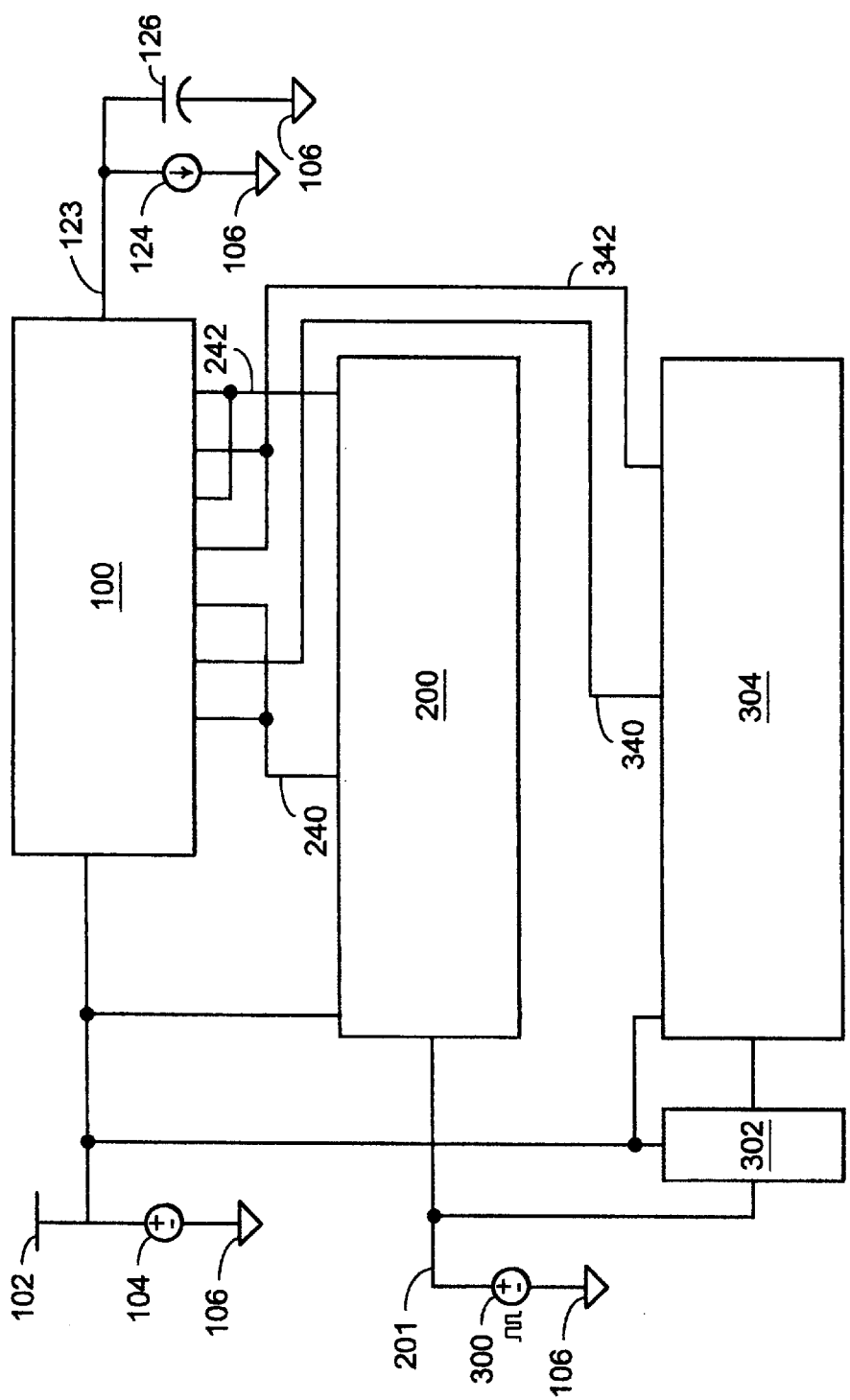
FIG. 3 is a block diagram of the charge pump and its associated variable-amplitude clock signal generation circuitry of the present invention.

The elements in FIGS. 1–3 are labeled with a naming system wherein the letter "M" refers to a transistor, "Mn" refers to an NMOS or N-type conductivity transistor that conducts with a logical high gate voltage and "Mp" refers to a PMOS or P-type conductivity transistor that conducts with a logical low gate voltage. In creating a PMOS transistor, the "body" or substrate of the transistor is made of an n-type material and which is assumed to be connected to the power supply voltage Vdd 102 unless otherwise stated. Similarly, an NMOS transistor has a body made of a p-type material and is assumed to be connected to ground 106 unless otherwise stated. The letter "C" indicates a capacitor with "CL" referring to a load capacitor which represents an outside connection to the circuit.

Referring now to FIG. 1, therein is shown a transistor level schematic of a charge pump 100 which takes a low voltage as an input and outputs a high voltage. The charge pump 100 is connected to a supply voltage Vdd 102, a power source 104, and a ground 106. The supply voltage Vdd 102 is a low voltage, such as 1.8V. The charge pump 100 has eight n-channel native transistors, Mn0 110, Mn1 112, Mn2 114, Mn3 116, Mn4 118, Mn5 120, Mn6 121, and Mn7 122, connected in series from lowest to highest number with the last seven transistors having an associated capacitor, C1 130, C2 132, C3 134, C4 136, C5 138, C6 140, and C7 142, connected to the gate of their respective transistor. The low voltage input, the power supply Vdd 102, is connected to the drain of the first transistor in the series Mn0 110 while the high voltage output, a high voltage output 123, is connected to the source of the last transistor Mn7 122. The high voltage output 123 is shown connected to a load represented by a current load 124 and a load capacitor CL 126. Each of the non-load capacitors is connected to a clock phase generator. The capacitor C1 130 is connected to a clock phase generator clock1 150, the capacitor C2 132 is connected to a clock phase generator clock2 152, the capacitor C3 134 is connected to a clock phase generator clock3 154, the capacitor C4 136 is connected to a clock phase generator clock4 156, the capacitor C5 138 is connected to a clock phase generator clock5 158, the capacitor C6 140 is connected to a clock phase generator clock6 160, and the capacitor C7 142 is connected to a clock phase generator clock7 162. All of the clock phase generators, clock1 150 through clock7 162, as well as the current load 124 and the capacitor load C7 126 are connected to ground 106.

A typical transistor has a switching threshold voltage, which is set by the doping of its channel. A transistor that has not undergone the channel doping process is termed a "native transistor" and has a lower threshold voltage because it must rely on the intrinsic background or body of the transistor to set the threshold voltage. The typical native transistor threshold voltage can range from 0.1V to 0.3V but the effective threshold voltage can be almost doubled due to the body effect at the high voltage end of the charge pump 100.

Each of the native transistors in the charge pump 100 is configured as a diode with the drain connected to the gate. In this configuration, current can only be delivered from the drain to the source. The transistor is biased "on" when the source has a lower voltage than the drain and the transistor is biased "off" when the source has a higher voltage than the drain.

The capacitors C1 130 and C2 132 are floating polysilicon (poly) capacitors or poly–poly2 capacitors, so named for the materials used in their formation. Although they are relatively efficient since they have small parasitic capacitances, they are only capable of handling about 8V. The capacitors C3 134, C4 136, C5 138, C6 140, and C7 142 are depletion-transistors in which the gate is one capacitor plate and the source and drain are connected together to form the other plate. These capacitors are less efficient than the floating poly capacitors since they have larger parasitic capacitances, but their voltage handling capability is in excess of 20V.

The clock phase generators alternate in phase with clock1 150, clock3 154, clock5 158, and clock7 162 in a first phase, and clock2 152, clock4 156, and clock6 160 in a second phase. The voltage amplitude of the clock signals of the clock phase generators clock1 150 through clock7 162 increases in the latter stages to compensate for the higher effective transistor threshold voltages due to the body effect. The clock signals from clock1 150, clock2 152, and clock3 154 have ideal amplitudes three times that of the supply voltage Vdd 102 and the clock signals from clock4 156, clock5 158, clock6 160, and clock7 162 have ideal amplitudes five times that of the supply voltage Vdd 102. (Parasitic and load capacitances decrease the amplitudes somewhat.)

In operation with reference to FIG. 1, the charge pump 100 shifts a charge along the series of diode-connected native transistors Mn1 112, Mn2 114, Mn3 116, Mn4 118, Mn5 120, Mn6 121, and Mn7 122 driven by capacitively coupled clock signals from respective clock phase generators clock1 150, clock2 152, clock3 154, clock4 156, clock5 158, clock6 160, and clock7 162. Along the way, the potential of the charge is increased until the charge reaches the high voltage output 123 at which point the desired voltage has been reached. Because the transistors Mn0 110, Mn1 112, Mn2 114, Mn3 116, Mn4 118, Mn5 120, Mn6 121, and Mn7 122 are diode-connected, they turn on when the source voltage is less than the drain voltage. The result is that voltage can only transfer from the drain to the source and not back. In the case where there is a positive first phase coupled through a capacitor, clock1 150, clock3 154, clock5 158, and clock7 162 are high and clock2 152, clock4 156, and clock6 160 are low; the transistors connected to the first phase clocks are turned "on" and the transistors connected to the second phase clocks are turned "off". A subsequent positive second phase coupled through capacitors shifts the charge built up in the high first phase clock cycle to the next diode-connected transistor for the charge to further build up.

Referring now to FIG. 2, therein is shown a transistor level schematic of "bootstrapping" circuitry 200 used in variable-amplitude clock signal generation. The circuitry 200 has the same power supply voltage Vdd 102 and ground 106 as in FIG. 1 and has a clock input 201 which oscillates from a high value of the power supply voltage Vdd 102 to a low voltage of ground 106 at a preset frequency. The circuitry 200 is composed of progressive stages of bootstrapping circuits, the output of each carrying an increasing multiple of the original power supply voltage Vdd 102.

The first stage includes a PMOS transistor 202 and an NMOS transistor 204 that are connected to form a CMOS inverter. The input to the CMOS inverter is also the input to the stage. The clock input 201 acts as the input and is connected to the gates of the PMOS transistor 202 and the NMOS transistor 204. The drain of the PMOS transistor 202 and the drain of the NMOS transistor 204 are connected to each other, and also to left plate of a capacitor C7 206. It will be noted that the nomenclature "left plate" and "right plate" are used as a matter of convenience with reference to FIG. 2, and are not intended to be limiting. The source of the PMOS transistor 202 is connected to the power supply voltage Vdd 102, and the source of the NMOS transistor 204 is connected to ground 106.

An NMOS transistor 212 and PMOS transistors 208 and 210 are connected together in conjunction with the CMOS inverter and capacitor C7 206 to form a bootstrapping circuit which takes an input voltage and doubles it at the output. The clock input 201 is connected to the gates of the PMOS transistor 210 and the NMOS transistor 212. The drain of the PMOS transistor 210 and the drain of the NMOS transistor 212 are connected to each other, the left plate of a capacitor C8 214, and the gate of the PMOS transistor 208. The connection between the left plate of the capacitor C8 214 and the gate of the PMOS transistor 208 is a feed back loop. The source of the PMOS transistor 210 and the drain of the PMOS transistor 208 are connected together, to the right plate of the capacitor C7 206, and to the bodies of the PMOS transistors 208 and 210. The source of the PMOS transistor 208 is connected to the power supply voltage Vdd 102 and the source of the NMOS transistor 212 is connected to ground 106.

In operation with reference to FIG. 2, the first stage provides an output voltage which pulses from 0V to twice the power supply voltage Vdd 102 and can be used to charge a load capacitance or a subsequent stage. When the input of the first stage, the clock input 201, is high, the NMOS transistors 204 and 212 are both conducting because their gates are connected to the high potential and the PMOS transistors 202 and 210 are not conducting due to the same high gate voltage. The output of the stage, the common connection between the PMOS transistor 210 and the NMOS transistor 212, has a direct connection to ground 106 through the conducting NMOS transistor 212. Because the output of the stage is at a low voltage and is connected to the gate of the PMOS transistor 208, the PMOS transistor 208 is conducting. A path from the power supply Vdd 102 to ground 106 is created through the conducting PMOS transistor 208 and NMOS transistor 204, charging the right plate of capacitor C7 206 to the power supply voltage Vdd 102 and causing the voltage of the left plate of the capacitor C7 206 to be at ground 106.

When the clock input 201 transitions from the high value of the power supply voltage Vdd 102 to ground 106, the NMOS transistors 204 and 212 turn off and the PMOS transistors 202 and 210 turn on. When the PMOS transistor 202 turns "on", there is a direct path through the PMOS transistor 202 to the power supply voltage Vdd 102, causing the left plate of the capacitor C7 206 to change from its initial voltage of 0V at ground 106 to the power supply voltage Vdd 102. At the same time, the NMOS transistor 212 turns "off", closing the connection between ground 106 and the output, and the PMOS transistor 210 is turned on, causing the right plate of the capacitor C7 206 to be connected to the output. This causes the voltage on the right plate of the capacitor C7 206 to be "pumped". The change in voltage at the output is twice the supply voltage Vdd 102, or the sum of the change in voltage on the left-hand plate of the capacitor C7 206 plus the voltage that had been stored in the capacitor C7 206.

The bootstrapping technique used to double the voltage used in the first stage can be cascaded wherein a plurality of stages are added with the final output being n+1 times the supply voltage Vdd 102 where n is equal to the number of stages used in the circuit. In FIG. 2, there are a total of four stages producing a final output voltage of 5 times the power supply voltage Vdd 102.

The second bootstrapping stage includes an NMOS transistor 220 and two PMOS transistors 216 and 218. These transistors are connected in the same manner as the transistors in the first stage of the bootstrapping circuit with the clock input 201 connected to the gates of the PMOS transistor 218 and the NMOS transistor 220. The drain of the PMOS transistor 218 and the drain of the NMOS transistor 220 are connected to each other, the left plate of a capacitor C9 222, a second stage output 240, and the gate of the PMOS transistor 216. The connection between the left plate of a capacitor C9 222 and the gate of the PMOS transistor 216 forms a feedback loop. The source of the PMOS transistor 218 and the drain of the PMOS transistor 216 are connected together, to the right plate of the capacitor C8 214, and to the bodies of the PMOS transistors 216 and 218. The source of the PMOS transistor 216 is connected to the power supply voltage Vdd 102 and the source of the NMOS transistor 220 is connected to ground 106. The second stage output 240 outputs a voltage three times that of the original power supply voltage Vdd 102 and is used as a clock to the charge pump 100 in FIG. 1.

The cascaded stages, including the second bootstrapping stage, operate on the same principle as the first stage. Instead of the clock input 201 and a CMOS inverter, the output of the first bootstrapping circuit serves as an input. When the clock input 201 is high with the value of the power supply voltage Vdd 102, the output of the first bootstrapping stage is connected to ground 106 and the NMOS transistor 220 is conducting, providing a direct pathway from the second stage output 240 to ground 106. With the second stage output 240 at a logical low level, the PMOS transistor 216 is conducting, creating a charging path from the power supply voltage Vdd 102 to the ground 106 in the prior bootstrapping circuit. This connects the right plate of capacitor C8 214 to the power supply voltage Vdd 102 and causes the left plate of the capacitor C8 214 to be at ground 106.

When the clock input 201 transitions from a high value of the power supply voltage Vdd 102 to a low value of ground 106, the NMOS transistor 220 turns "off"and the PMOS transistor 218 turns "on" at the same time that NMOS transistor 212 turns "off" and PMOS transistor 210 turns "on". The capacitors C7 206 and C8 214, each charged to a voltage equal to supply voltage 102, are thus connected in series to each other and to supply voltage Vdd 102. The falling edge of the clock input 201 thus produces a rising edge of 3 times the Vdd on the second stage output 240.

The third bootstrapping stage includes an NMOS transistor 228 and two PMOS transistors 224 and 226. These transistors are connected in the same way as the transistors in the second stage of the bootstrapping circuit with the clock input 201 connected to the gates of the PMOS transistor 226 and the NMOS transistor 228. The drain of the PMOS transistor 226 and the drain of the NMOS transistor 228 are connected to each other, the left plate of a capacitor C10 230, and the gate of the PMOS transistor 224. The connection between the left plate of the capacitor C10 230 and the gate of the PMOS transistor 224 forms a feedback loop. The drain of the PMOS transistor 224 and the source of the PMOS transistor 226 are connected together, to the right plate of the capacitor C9 222, and to the bodies of the PMOS transistors 224 and 226. The source of the PMOS transistor 224 is connected to the power supply voltage Vdd 102 and the source of the NMOS transistor 228 is connected to ground 106.

The fourth and final bootstrapping stage includes an NMOS transistor 236 and two PMOS transistors 232 and 234. These transistors are connected similarly to the transistors in the third stage of the bootstrapping circuit with the clock input 201 connected to the gates of the PMOS transistor 234 and the NMOS transistor 236. The drain of the PMOS transistor 234 and the drain of the NMOS transistor 236 are connected to each other, a fourth stage output 242, and the gate of the PMOS transistor 232. The drain of the PMOS transistor 232 and the source of the PMOS transistor 234 are connected together, to the right plate of the capacitor C10 230, and to the bodies of the PMOS transistors 232 and 234. The source of the PMOS transistor 232 is connected to the power supply voltage Vdd 102 and the source of the NMOS transistor 236 is connected to ground 106. The fourth stage output 242 carries a voltage five times that of the original power supply voltage Vdd 102 and is used as a clock to the charge pump 100 in FIG. 1.

As would be evident to those skilled in the art, additional stages could be added to obtain higher voltages. It should also be noted that the size of the bootstrap capacitors (capacitor C7 206 through capacitor C10 230) must be large compared to the charge pump capacitors (capacitor C1 130 through capacitor C7 142).

Referring now to FIG. 3, therein is shown a block diagram of the charge pump 100 and its associated variable-amplitude bootstrapping circuitry in which discrete clock phase generators are replaced by phase bootstrapping circuitry. The block diagram shows the same power supply voltage Vdd 102 and ground 106 as in FIG. 1 as well as a clock signal generator 300 which generates the clock input 201 in FIG. 2. The block diagram includes the charge pump 100, the first phase bootstrapping circuitry 200, a CMOS inverter 302, and a second phase bootstrapping circuitry 304.

The second phase bootstrapping circuitry 304 is the same as the first phase bootstrapping circuitry 200. The power supply voltage Vdd 102 and ground 106 are connected to the second phase bootstrapping circuitry 304 directly, but the CMOS inverter 302 inverts its clock input. The equivalents of the second stage output 240 and the fourth stage output 242 are a second stage output 340 and a fourth stage output 342, respectively.

The power supply voltage Vdd 102 acts as the initial voltage for the charge pump 100 and provides a supply voltage to each of the other blocks. The clock input 201 is connected to the first phase bootstrapping circuitry 200 and provides clock signals of the same phase as the clock input 201 with amplitudes of three times the power supply voltage Vdd 102 in the second stage output 240 and five times the power supply voltage Vdd 102 in the fourth stage output 242. The signals connect to the charge pump 100 wherein the second stage output 240 replaces the FIG. 1 clock phase generating clocks clock1 150 and clock3 154 and the fourth stage output 242 replaces the FIG. 1 clock phase generating clocks clock5 158 and clock7 162. The clock input 201 is also connected to the CMOS inverter 302 which inverts the clock signals and provides an input to the second phase bootstrapping circuitry 304 which is of a second phase, opposite of the original clock input 201. The second phase bootstrapping circuitry 300 outputs clock signals with this alternate phase and with amplitudes of three times the power supply voltage Vdd 102 in the second stage output 340, and five times the power supply voltage Vdd 102 in the fourth stage output 342. The signals connect to the charge pump 100 wherein the second stage output 340 replaces the FIG. 1 clock phase generating clock clock2 152 and the fourth stage output 342 replaces the FIG. 1 clock phase generating clocks clock4 156 and clock6 160.

The output of the above is provided at the high voltage output 123.

While the invention has been described in conjunction with a specific best mode, it is to be understood that many alternatives, modifications, and variations will be apparent to those skilled in the art in light of the foregoing description. Accordingly, it is intended to embrace all such alternatives, modifications, and variations that fall within the spirit and scope of the included claims including the usage of a generic voltage input signal instead of the specific case of a power supply voltage. All matters hither-to-fore set forth herein or shown in the accompanying drawings are to be interpreted in an illustrative and non-limiting sense.

The invention claimed is:

1. A charge pump system for connection to a power supply voltage and a clock, comprising:
  a first phase bootstrapping circuit responsive to the clock to provide a first phase clock signal, the first phase bootstrapping circuit including:
    a first phase bootstrapping circuit input;
    an initial bootstrapping stage including switching circuits having an input and an output, the input connected to the first phase bootstrapping circuit input;

a plurality of cascaded bootstrapping stages including switching circuits having an input and an output, the plurality of cascaded bootstrapping stages cascaded with the initial bootstrapping stage; and a plurality of first bootstrapping circuit outputs, each of the first bootstrapping circuit outputs connected to the output of one of the plurality of cascaded bootstrapping stages to provide an output with amplitude greater than the input thereof;

inverting circuitry responsive to the clock with an inverted clock output opposite in phase to the clock;

a second phase bootstrapping circuit responsive to the inverted clock output to provide a second phase clock signal opposite in phase to the first phase clock signal; and charge pump circuitry responsive to the power supply voltage and the first and second phase clocks whereby the power supply voltage is increased by alternately adding charge to the power supply voltage from the power supply voltage in each cycle of the first and second phase clock signals.

2. The charge pump system as claimed in claim 1 wherein:
the inverting circuitry includes two transistors.

3. The charge pump system as claimed in claim 1 wherein:
the second phase bootstrapping circuit includes:
   a second phase bootstrapping circuit input;
   an initial bootstrapping stage including switching circuits having an input and an output, the input connected to the second phase bootstrapping circuit input;
   a plurality of cascaded bootstrapping stages including switching circuits having an input and an output, the input connected to the initial bootstrapping stage; and
   a plurality of second bootstrapping circuit outputs, each of the second bootstrapping circuit outputs connected to the output of one of the plurality of cascaded bootstrapping stage to provide an output with amplitude greater than the input thereof.

4. The charge pump system as claimed in claim 1 wherein:
the charge pump circuitry includes:
   a charge pump input for receiving an input voltage to be pumped;
   a charge pump output for providing a pumped output voltage
   a plurality of charge pump stages connected in series, a first of the plurality of charge pump stages connected to the charge pump input and a last of the plurality of charge pump stages connected to the charge pump output;
   a first plurality of storage devices coupling first alternate charge pump stages with the first phase bootstrapping circuitry; and
   a second plurality of storage devices coupling second alternate charge pump stages with the second phase bootstrapping circuitry.

5. The charge pump system as claimed in claim 1 wherein:
the charge pump circuitry includes a plurality of charge pump stages connected in series, each of the charge pump stages having an input and an output; and
the charge pump circuitry pumps an input voltage at the input of alternate charge pump stages to a voltage in excess of the input voltage in response to the first and second phase clock signals and provides the voltage to the output.

6. The charge pump system as claimed in claim 1 wherein:
the first and second phase bootstrapping circuits provide variable-amplitude first and second phase clock signals.

7. A charge pump system for connection to a power supply voltage and a clock, comprising:
a first phase bootstrapping circuit responsive to the clock and providing a first phase clock signal having a multiple of the power supply voltage, the first phase bootstrapping circuit including:
   a first phase bootstrapping circuit input;
   an initial bootstrapping stage having:
      an inverter;
      a plurality of interconnected transistors responsive to the clock and connected to the inverter;
      a charge storage circuit for storing charge and connected to the inverter and the interconnected transistors; and
      an output from and connected to the interconnected transistors as a feedback loop; and
   a plurality of cascaded bootstrapping stages, each of the plurality of bootstrapping stages connected to a prior bootstrapping stage and providing an output with amplitude greater than the input thereof and having:
      a charge storage circuit for storing charge; and
      a plurality of interconnected transistors connected to the charge storage circuit; and
      an output from and connected to the interconnected transistors as a feedback loop;
an inverter responsive to the clock providing an inverted clock output opposite in phase to the clock;
a second phase bootstrapping circuit responsive to the inverted clock output to provide a second phase clock signal having a multiple of the power supply voltage and opposite in phase to the first phase clock signal; and
charge pump circuitry responsive to the power supply voltage and the first and second phase clocks for increasing the power supply voltage by adding the multiples of the power supply voltage from the first and second phase bootstrapping circuits whereby the power supply voltage is increased by alternately adding charge to the power supply voltage from the power supply voltage in each cycle of the first and second phase clock signals.

8. The charge pump system as claimed in claim 7 wherein:
the inverter has two transistors.

9. The charge pump system as claimed in claim 7 wherein:
the second phase bootstrapping circuit includes:
   a second phase bootstrapping circuit input;
   an initial bootstrapping stage having:
      an inverter;
      a plurality of interconnected transistors responsive to the clock and connected to the inverter;
      a charge storage circuit for storing charge and connected to the inverter and the interconnected transistors; and
      an output from and connected to the interconnected transistors as a feedback loop; and
   a plurality of cascaded bootstrapping stages, each of the plurality of cascaded bootstrapping stages connected to a prior bootstrapping stage and providing an output with amplitude greater than the input thereof and having:
      a charge storage circuit for storing charge;
      a plurality of interconnected transistors; and
      an output from and connection to the interconnected transistors as a feedback loop.

10. The charge pump system as claimed in claim 7 wherein:
  the charge pump circuitry includes:
    a charge pump input for receiving an input voltage to be pumped;
    a first plurality of charge storage circuits coupling every other charge pump stage with the first phase bootstrapping circuitry;
    a second plurality of charge storage circuits coupling the rest of the charge pump stages with the second phase bootstrapping circuitry;
    a plurality of transistors connected in series, one of the plurality of transistors connected to the charge pump input and another one of the plurality of transistors connected to a voltage output, the plurality of transistors responsive to the first and second phase bootstrapping circuitries; and
    a charge pump output for providing an output voltage in excess of the input voltage.

11. The charge pump system as claimed in claim 7 wherein:
  the charge pump circuit pumps the input voltages of alternate stages to a voltage in excess of the input voltage in response to the first and second phase clock signals.

12. The charge pump system as claimed in claim 7 wherein:
  the first and second phase bootstrapping circuits provide variable-amplitude clock signals which increase in voltage as the voltage level in the charge pump increases.

13. A charge pump system having a power supply voltage and a clock including:
  a first phase bootstrapping circuit responsive to the clock and providing a first phase clock signal, the first phase bootstrapping circuit including:
    a first phase bootstrapping circuit input;
    an initial bootstrapping stage having:
      a CMOS inverter;
      a plurality of interconnected PMOS and NMOS transistors responsive to the clock and connected to the CMOS inverter;
      a capacitor for storing charge and connected to the CMOS inverter and the interconnected PMOS and NMOS transistors; and
      an output from and connected to the interconnected PMOS and NMOS transistors as a feedback loop; and
    a plurality of cascaded bootstrapping stages each connected to a prior bootstrapping stage, providing an output with amplitude greater than the input of the associated bootstrapping stage and having:
      a capacitor for storing charge; and
      a plurality of interconnected PMOS and NMOS transistors; and
      an output from and connected to the interconnected PMOS and NMOS transistors as a feedback loop;
  a CMOS inverter responsive to the clock with an inverted clock output opposite in phase of the clock;
  a second phase bootstrapping circuit responsive to the inverted clock output and providing a second phase clock signal opposite in phase to the first phase clock signal; and
  charge pump circuitry responsive to the power supply voltage and the first and second phase clocks whereby a high voltage is produced by alternately adding charge to the power supply voltage in each cycle of the first and second phase clocks.

14. The charge pump system as claimed in claim 13 wherein:
  the second phase bootstrapping circuit includes:
    a second phase bootstrapping circuit input;
    an initial bootstrapping stage having:
      a CMOS inverter;
      a plurality of interconnected PMOS and NMOS transistors responsive to the clock and connected to the CMOS inverter;
      a capacitor for storing charge and connected to the CMOS inverter and the interconnected PMOS and NMOS transistors; and
      an output from and connected to the interconnected PMOS and NMOS transistors as a feedback loop; and
    a plurality of cascaded bootstrapping stages each connected to a prior bootstrapping stage, providing an output with amplitude greater than the input of the associated bootstrapping stage and having:
      a capacitor for storing charge;
      a plurality of interconnected PMOS and NMOS transistors; and
      an output from and connected to the interconnected PMOS and NMOS transistors as a feedback loop.

15. The charge pump system as claimed in claim 13 wherein:
  the charge pump circuitry includes:
    a charge pump input for receiving an input voltage to be pumped;
    a first plurality of capacitors coupling every other charge pump stage with the first phase bootstrapping circuitry;
    a second plurality of charge circuits capacitors coupling the rest of the charge pump stages with the second phase bootstrapping circuitry;
    a plurality of native transistors connected in series, attached at one end to the charge pump input, and responsive to the first and second phase bootstrapping circuitries; and
    a charge pump output for providing an output voltage in excess of the input voltage.

16. The charge pump system as claimed in claim 13 wherein:
  the charge pump circuit pumps the input voltages of alternate stages to a voltage in excess of the input voltage in response to the first and second phase clock signals.

17. The charge pump system as claimed in claim 13 wherein:
  the first and second phase bootstrapping circuits provide variable-amplitude clock signals which increase in voltage as the voltage level in the charge pump increases.

* * * * *